United States Patent [19]

Armbristor

[11] Patent Number: 5,250,100
[45] Date of Patent: Oct. 5, 1993

[54] SOLID WASTE RECOVERY SYSTEM

[75] Inventor: Donnie L. Armbristor, Claremore, Okla.

[73] Assignee: World Life Resource, Inc., Tulsa, Okla.

[21] Appl. No.: 306,094

[22] Filed: Feb. 6, 1989

[51] Int. Cl.[5] .............................. C05F 9/04; C05F 17/00
[52] U.S. Cl. ................................................ 71/9; 71/14; 71/64.04; 71/901
[58] Field of Search ............... 71/9, 11, 901, 14, 64.04

[56] References Cited

U.S. PATENT DOCUMENTS

| | | | |
|---|---|---|---|
| 2,798,800 | 7/1957 | Geraghty et al. | 71/901 |
| 3,236,604 | 2/1966 | Pierson | 71/901 X |
| 4,050,917 | 9/1977 | Varro | 71/901 X |
| 4,053,394 | 10/1977 | Fisk | 71/64.04 X |
| 4,079,837 | 3/1978 | Grube et al. | 71/901 X |
| 4,264,352 | 4/1981 | Houser | 71/64.04 X |
| 4,874,134 | 10/1989 | Wiens | 71/14 X |

Primary Examiner—Ferris Lander
Attorney, Agent, or Firm—Neal J. Mosley

[57] ABSTRACT

A solid waste recovery system processes solid wastes which would otherwise be sent to a landfill by utilizing several stages of systematically separating and processing various components of the refuse. Refuse is trucked in and dumped on a tipping floor of the recovery facility and separated into non-compostables, recyclables, and compostable materials. The non-compostables are further separated into recyclable inorganics which are recaptured as resalable items and into non-compostable organics which are further separated into hospital and clinical wastes to be incinerated or disposed of as hazardous waste, and into petroleum products to be incinerated, sent to a landfill or disposed of as hazardous waste, or recycled. The refuse remaining on the tipping floor is further separated into fuel items for resale or heating the facility, into recyclables which are processed for resale, and into compostables which are blended and ground into fine particles for resale or sent to a compost pad for conversion into compost for resale. The solid waste is recaptured in the form of baled paper and cardboard material to be sold to a paper recycling mill and containerized recyclables such as plastic, glass, aluminum, ferrous metals, etc., to be sold to their respective mills. The non-recyclable refuse is processed into fine particles to be sold in bulk as fluff or after further processing to be sold as compost fertilizer.

17 Claims, 2 Drawing Sheets

SOLID WASTE RECOVERY SYSTEM

BACKGROUND OF THE INVENTION

1. Field of the Invention

This invention relates generally to solid waste recovery systems, and more particularly to a solid waste recovery system which processes solid wastes which would otherwise be sent to a landfill by utilizing several stages of systematically separating and processing various components of the refuse into valuable resources.

2. Brief Description of the Prior Art

Disposal of municipal solid waste has become a major concern in this country. Landfills which were originally thought to be a solution to the problem are no longer efficient. Not only are they filling up much faster than anticipated, but in some instances they are actually contributing to the problem. Incineration methods have some utility, however the associated costs involved and the problems arising from air pollution make it undesirable as a final solution. It is therefore of great importance to open this field to new industries which will provide innovative solutions to the problems of handling solid waste and will provide the added benefit of recovering portions of the waste as usable resources.

There are several patents which disclose various waste disposal, sorting, and recovery systems.

Matanovich-Manov et al, U.S. Pat. NO. 2,257,567 discloses a garbage disposal plant sorting apparatus.

Schroering, U.S. Pat. No. 3,557,685 discloses a garbage disposal plant where salvageable material is separated and residue material is shredded and compacted or bailed for transport to a sanitary landfill.

Talamantz, U.S. Pat. No. 3,804,248 discloses a garbage disposal plant were salvageable material is separated using a multiple conveyor system.

Nash, U.S. Pat. No. 3,878,995 discloses a refuse shredder and classifier for separating trash and storing in separate bins.

Wilson, U.S. Pat. No. 3,888,351 discloses a garbage disposal plant were salvageable material is separated using a system having multiple screens, bins, and conveyors.

Stehle et al, U.S. Pat. No. 4,763,793 discloses a garbage disposal plant were salvageable material is separated using a system having multiple screens and conveyors.

Weitzman et al, U.S. Pat. No. 4,667,291 discloses a garbage disposal plant were salvageable material is separated and recovered.

Fry, U.S. Pat. No. 4,553,977 discloses a garbage disposal plant were salvageable material is separated and organic material sent to a landfill or converted into fuel.

Flender, U.S. Pat. No. 4,187,775 discloses a garbage disposal plant were waste materials are separated and treated according to the particular requirements of the recovered material. Like materials from different flow lines are combined for like treatment.

The present invention is distinguished over the prior art in general, and these patents in particular by a solid waste recovery system for processing solid wastes which would otherwise be sent to a landfill by utilizing several stages of systematically separating and processing various components of the refuse. Refuse is trucked in and dumped on a tipping floor of the recovery facility and separated into non-compostables, recyclables, and compostable materials. The non-compostables are further separated into recyclable inorganics which are recaptured as resalable items and into non-compostable organics which are further separated into hospital and clinical wastes to be incinerated or disposed of as hazardous waste, and into petroleum products to be incinerated, sent to a landfill or disposed of as hazardous waste, or recycled. The refuse remaining on the tipping floor is further separated into fuel items for resale or heating the facility, into recyclables which are processed for resale, and into compostables which are blended and ground ,into fine particles for resale or sent to a compost pad for conversion into compost for resale. The solid waste is recaptured in the form of baled paper and cardboard material to be sold to a paper recycling mill and containerized recyclables such as plastic, glass, aluminum, ferrous metals, etc., to be sold to their respective mills. The non-recyclable refuse is processed into fine particles to be sold in bulk as fluff or after further processing to be sold as compost fertilizer.

SUMMARY OF THE INVENTION

It is therefore an object of the present invention to provide a solid waste recovery system which efficiently and economically processes solid wastes which would otherwise be sent to a landfill by utilizing several stages of systematically separating and processing various components of the refuse into valuable resources.

It is another object of this invention to provide a solid waste recovery system which separates refuse into non-compostables, recyclables, and compostable materials wherein the non-compostables are further separated into recyclable inorganics which are recaptured as resalable items or sent to a landfill and into non-compostable organics which are separated into hospital and clinical wastes to be incinerated or disposed of as hazardous waste, and into petroleum products to be incinerated, sent to a landfill or disposed of as hazardous waste, or recycled.

Another object of this invention is to provide a solid waste recovery system which separates refuse into non-compostables, recyclables, and compostable materials wherein the remaining refuse is further separated into fuel items for resale or heating the facility, into recyclables which are processed for resale, and into compostables which are blended and ground into fine particles for resale or sent to a compost pad for conversion into compost for resale as fertilizer.

A further object of this invention is to provide a solid waste recovery system which separates refuse into non-compostables, recyclables, and compostable materials wherein the processed solid waste is recaptured and resold in the form of baled paper and cardboard material, containerized recyclables such as plastic, glass, aluminum, ferrous metals, etc., to be sold to their respective mills and the non-recyclable refuse is processed into fine particles to be sold in bulk as fluff or after further processing to be sold as compost fertilizer.

A still further object of this invention is to provide a solid waste recovery system which is efficient and economical in operation and requires only minimum labor.

Other objects of the invention will become apparent from time to time throughout the specification and claims as hereinafter related.

The above noted objects and other objects of the invention are accomplished by a solid waste recovery system for processing solid wastes which utilizes several stages of systematically separating and processing various components of the refuse. Refuse is trucked in and dumped on a tipping floor of the recovery facility and separated into non-compostables, recyclables, and compostable materials. The non-compostables are further separated into recyclable inorganics which are recaptured as resalable items and into non-compostable organics which are further separated into hospital and clinical wastes to be incinerated or disposed of as hazardous waste, and into petroleum products to be incinerated, sent to a landfill or disposed of as hazardous waste, or recycled. The refuse remaining on the tipping floor is further separated into fuel items for resale or heating the facility, into recyclables which are processed for resale, and into compostables which are blended and ground into fine particles for resale or sent to a compost pad for conversion into compost for resale. The solid waste is recaptured in the form of baled paper and cardboard material to be sold to a paper recycling mill and containerized recyclables such as plastic, glass, aluminum, ferrous metals, etc., to be sold to their respective mills. The non-recyclable refuse is processed into fine particles to be sold in bulk as fluff or after further processing to be sold as compost fertilizer.

DESCRIPTION OF THE PREFERRED EMBODIMENT

Figure 1A:
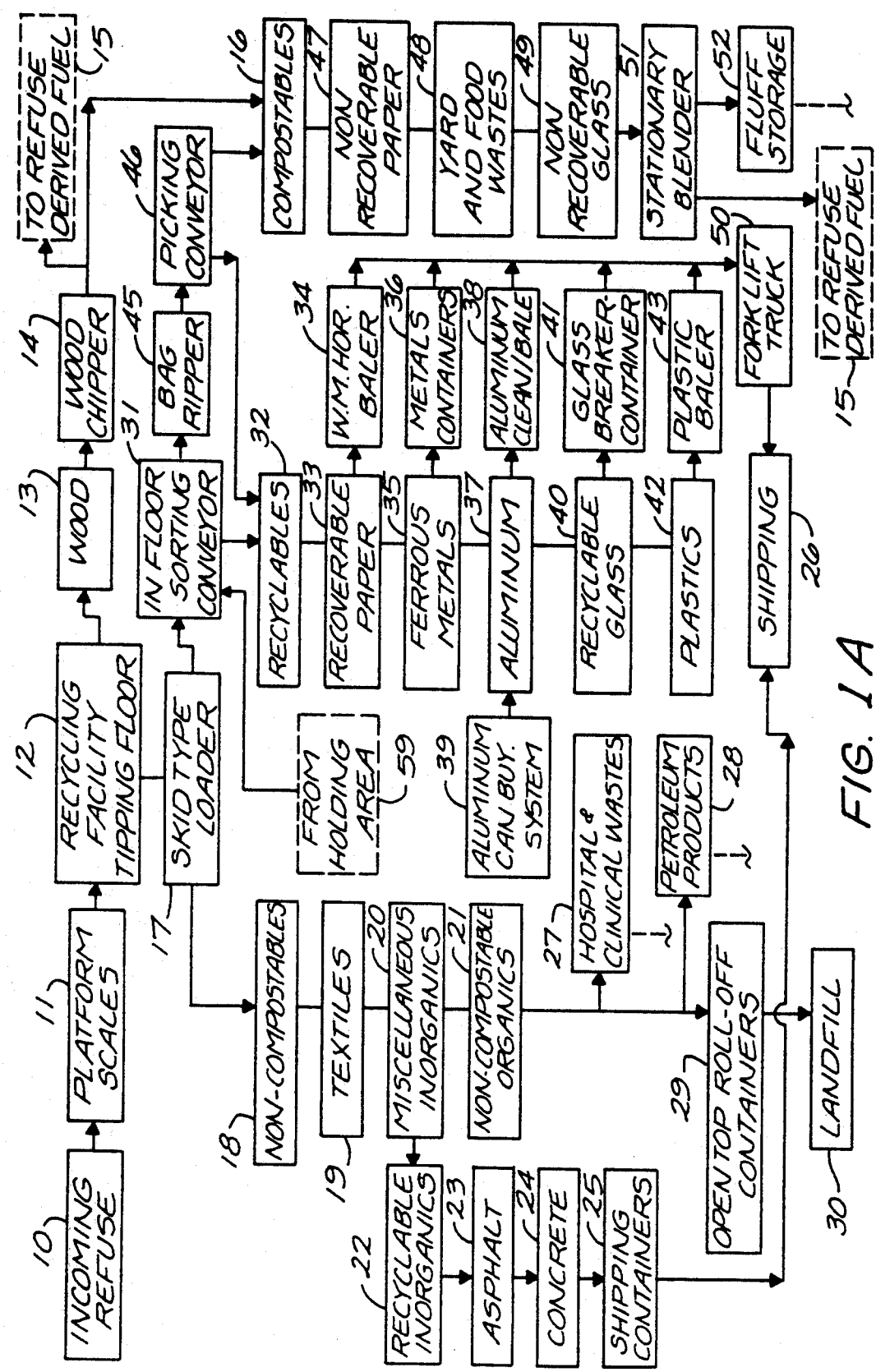
FIG. 1A is a schematic flow chart illustrating certain stages of the solid waste recovery system in accordance with the present invention.

Referring to FIG. 1A of the flow diagrams by numerals of reference, a preferred solid waste recovery system is schematically illustrated. A refuse truck filled with incoming refuse 10 enters a recovery facility after being weighed on platform scales 11 and dumps its load on a tipping floor 12. The empty truck is weighed again upon its exit.

The dumped refuse is separated on the tipping floor 12 into compostable, non-compostable, and recyclable items. Large wood items 13 are removed and sent to a chipper 14 for recycling either into refuse derived fuel items 15 or into compostable items 16.

A skid type loader 17 removes the non-compostable items 18 such as textiles 19, miscellaneous inorganics 20, and non-compostable organics 21 from the tipping floor 12. Recyclable inorganics 22 such as asphalt 23 and concrete items 24 are separated from the miscellaneous inorganics 20, loaded into containers 25 and sent to the shipping department 26. Hospital and clinical wastes 27 and petroleum products 28 are removed from the non-compostable organics 21 for further processing described hereinafter and the remaining non-compostables 18, such as textiles 19, miscellaneous inorganics 20, and organics 21 are loaded into containers 29 and transported to a landfill 30.

The refuse remaining on the tipping floor 12 is pushed by the loader 17 onto a sorting conveyor 31 in the tipping floor 12 for sorting. This remaining refuse is either recyclables 32, compostables 16, or a combination thereof contained in plastic garbage bags. In the sorting operation, recoverable paper items 33 are removed from the sorting conveyor 31 and transported by other conveyors to a baler 34 and baled. Ferrous metals 35 are removed and placed in containers 36. Aluminum materials 37 are removed and sent to a cleaner and baler 38.

Other aluminum materials such as from a can buying system 39 may be added to the aluminum materials 37 for cleaning and baling. Recyclable glass items 40 are removed and transported to a glass breaker and placed in containers 41. Plastic items 42 are removed and transported to a baler 43 and baled 44.

The plastic bags remaining on the sorting conveyor 31 continues to a bag ripper 45 where individual plastic garbage bags are ripped open and the contents thereof are scattered onto a picking conveyor 46. This refuse now remaining on the picking conveyor 46 after the bag ripping operation 45 comprises substantially recyclables 32 and compostables 16 such as non-recoverable paper 47, yard and food wastes 48, and nonrecoverable glass 49. The additional recyclable items 32 such as recoverable paper items 33, ferrous metals 35, aluminum items 37, recyclable glass items 40, and plastic items 42 are removed and transported to the appropriate balers, breakers, cleaners, and containers as described above. The baled and containerized recyclables are then transported by fork lift 50 to the shipping department 26.

The compostables 16 such as non-recoverable paper 47, yard and food wastes 48, and non-recoverable glass 49 are transported to a stationary blender 51 where they are ground into fine particles or "fluff" and are then either stored 52 for conversion into compost or refuse derived fuel 15.

Figure 1B:
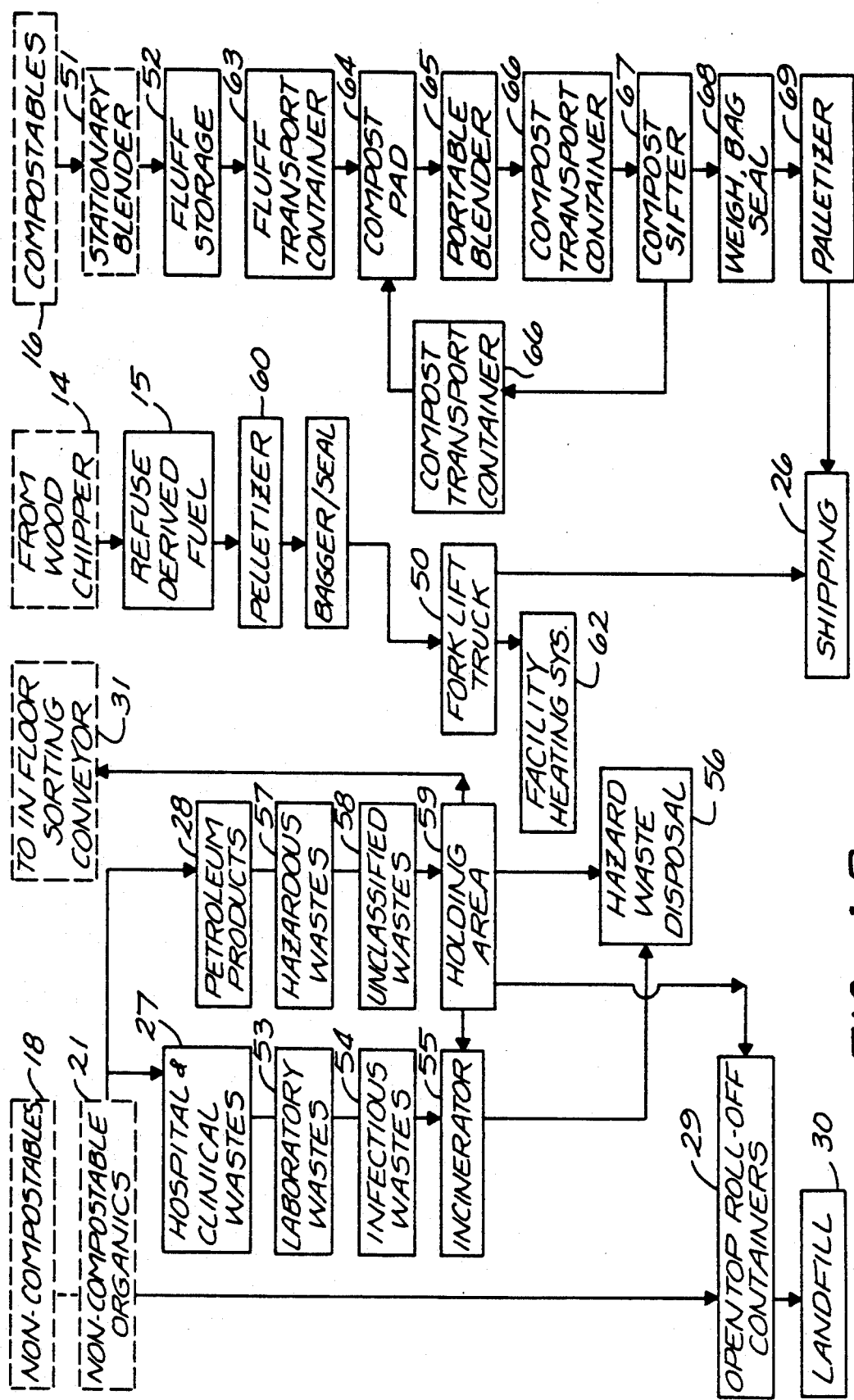
FIG. 1B is a schematic flow chart illustrating a continuation of the stages of the solid waste recovery system in accordance with the present invention.

Referring additionally to FIG. 1B, as previously described above, the non-compostable organics 21 of the compostables 18 are separated into hospital and clinical wastes 27 and petroleum products 28. The hospital and clinical wastes 27 comprise laboratory wastes 53 and infectious wastes 54 which are transported to an incinerator 55 and after incineration are removed to a hazardous waste disposal facility 56. The petroleum products 28 comprise hazardous wastes 57 and unclassified wastes 58 which are transported to a holding area 59. From the holding area 59, the petroleum products are sent either to the incinerator 55, to the hazardous wastes disposal site 56, placed in containers 29 and sent to the landfill 30, or sent back to the in-floor sorting conveyor 31 for reprocessing.

Also previously described, the large wood items 13 are removed and sent to a chipper 14 for recycling either into refuse derived fuel items 15 or into compostable items 16. The wood items suitable for fuel are sent to a pelletizer 60, bagged and sealed 61, and carried by fork lift to the facility heating system 62 for heating the facility, or to the shipping department 26.

The compostables 16 from both the wood chipper 14 and the picking conveyor 46 which are not used for fuel, as described above, are processed in the stationary blender 51 where it is ground into fine particles or "fluff" and sent to fluff storage 52 for conversion into compost. These items comprise wood chips 15, non-recoverable paper 47, yard and food wastes 48, and non-recoverable glass items 49.

From the fluff storage 52, the blended fluff or fine particle materials are placed in transport containers 63 and sent to a compost pad 64. The fluff may be composted by itself or mixed with other compostable substances such as city sludge, chicken litter, and/or other organic materials of a compostable nature.

The fluff is dumped from the transport containers 63 onto the compost pad 64 in rows of piles or windrows similar to hay windrows. The compost pad 64 is configured such that water or residue from composting material will run off into a holding pond with substantially no escape. Water is pumped back onto the compost windrows The compost pad 64 has a protective covering of suitable material such as clay, asphalt, or concrete to prevent seeping or leaching of liquid residue into the earth or water supply.

The piles of fluff are manipulated with a portable blender 65 to commingle and mix such that the fluff is consistent in texture. Samples of the mixed fluff are send to a lab and subjected to a carbon nitrogen ratio test. A suggested suitable ratio for the fluff mix would be 40 parts of carbon to 1 part nitrogen. If the ratio is determined to be an unsatisfactory percentage, then it is adjusted to a proper ratio by the addition of nitrogen, urea, or other suitable materials.

The temperature of the fluff mixture is checked and recorded. The preferred temperature should approximate the outdoor temperature on the day the reading is taken. The moisture of the fluff mix is also checked and recorded, and adjusted if required. The preferred moisture reading for proven results is from 50% to 60%, although it could vary.

In some fluff material mixtures, additives are not required to start the composting process, however if necessary, bacteria or chemicals, conventionally used in composting, may be added to initiate the decaying of the organic substances.

After the fluff-compost mixture has been determined to have the proper ratio, temperature, moisture, and chemical or bacterial content, the mixture is again manipulated and allowed to cure. Readings are again taken of the mixture to determine that it has sufficiently cured.

After curing, the fluff-compost may be loaded into compost transport containers 66 and returned to the facility where it is sifted and graded 67. Some coarser fluff-compost materials may be loaded into other compost transport containers 66 and returned to the compost pad 64 for re-composting. The sifted fluff-compost suitable for use is then weighed, bagged, and sealed 68, and then placed on pallets 69 and sent to the shipping department 26.

The recycling process of the present invention provides efficient and economical processing and recapture of solid waste products which would normally be sent to a landfill. From the shipping department, the baled paper and cardboard material may e sold to a paper recycling mill. After processing, the containerized recyclables such as plastic, glass, aluminum, ferrous metals, etc., may be sold to their respective mills. The non-recyclable refuse which has been ground into fine particles may be sold as containerized fluff or after further processing may be sold as compost in bulk form as fertilizer. The composted material is suitable for use on nearly any soil which needs plant foods to enhance and increase the growth of plant life.

While this invention has been described fully and completely with special emphasis upon a preferred embodiment, it should be understood that within the scope of the appended claims the invention may be practiced otherwise than as specifically described herein.

I claim:

1. A combined physical and chemical process for recycling of solid waste into recoverable resources comprising the steps, in sequence, of:

separating said solid waste into non-compostable, recyclable, and compostable items, said step of separating said solid waste including removing any large wood items present and sending them to a wood chipper and mixing said wood chips with other compostables for conversion into compost, separating and removing recoverable cardboard and paper items from said solid waste, blending non-recoverable cardboard and paper items with said compostable material for grinding into fine particles for processing into compost, blending said mixture of compostable items, wood chips, and non-recoverable paper and cardboard items and grinding the blend into fine particles of compostable material, placing said fine particles into transport containers and sending them to a compost pad configured such that water or residue from composting material will run off into a holding pond and having a protective covering to prevent seeping or leaching of liquid residue into the earth or water supply, dumping said fine particles from said transport containers onto a compost pad in windows, mixing said fine particles of compostable material with bacteria, chemicals or other organic matter operable to initiate composting by initiating the decaying process of said fine particles of compostable material and of the organic substances contained therein, curing said decayed compost material by pumping water onto said compost windrows, manipulating and blending said windrows of fine particle material until consistent in texture, subjecting samples of said blended materials to a carbon:nitrogen ratio test, and if the ratio is determined to be an unsatisfactory percentage, adding additional chemicals to said blended materials to obtain a predetermined proper ratio, checking and recording the temperature of said blended materials, checking and recording the moisture of said blended materials and adjusting the moisture if required, p1 after said blended materials have been determined to have the predetermined carbon:nitrogen ratio, temperature, moisture, and chemical or bacterial content, manipulating said blended materials again and allowing them to cure, after curing, sifting and grading said cured compost material, returning the coarser composted materials unsuitable for use as compost to said compost pad for re-composting, and weighing, bagging, and sealing said sifted compost material for resale to appropriate markets suitable for use as compost or fertilizer.

2. A process according to claim 1 wherein
the predetermined carbon nitrogen ratio of said blended materials is 40 parts carbon to 1 part nitrogen.

3. A process according to claim 1 wherein
the preferred temperature of said blended materials approximates the outdoor temperature on the day the reading is taken.

4. A process according to claim 1 wherein
the moisture content of said blended materials is from 50% to 60%.

5. A combined physical and chemical process for recycling of solid waste into recoverable resources comprising the steps, in sequence, of;

providing a facility having a tipping floor and a plurality of conveyors, receiving and dumping refuse on said tipping floor of said facility, separating the refuse on the tipping floor into non-compostable, recyclable, and compostable items, further separating said non-compostable items into recyclable inorganic items and into non-compostable organic items, containerizing said recyclable inorganic items for resale to appropriate markets, further separating said non-compostable organic items into hospital and clinical wastes and into petroleum products, incinerating said hospital and clinical wastes and sending said incinerated material to a hazardous waste facility, further separating said petroleum products and sending certain ones to a landfill, incinerating certain other ones and sending said incinerated material to a hazardous waste facility, and returning certain other ones to said tipping floor facility for recycling, said step of separating said solid waste including removing any large wood items present and sending them to a wood chipper and mixing said wood chips with other compostables for conversion into compost, separating and removing recoverable cardboard and paper items from said solid waste, blending non-recoverable cardboard and paper items with said compostable material for grinding into fine particles for processing into compost, blending said mixture of compostable items, wood chips, and non-recoverable paper and cardboard items and grinding the blend into fine particles of compostable material, placing said fine particles into transport containers and sending them to a compost pad configured such that water or residue from composting material will run off into a holding pond and having a protective covering to prevent seeping or leaching of liquid residue into the earth or water supply, dumping said fine particles from said transport containers onto a compost pad in windrows, mixing said fine particles of compostable material with bacteria, chemicals or other organic matter operable to initiate composting by initiating the decaying process of said fine particles of compostable material and of the organic substances contained therein, curing said decayed compost material by pumping water onto said compost windrows, manipulating and blending said windrows of fine particle material until consistent in texture, subjecting samples of said blended materials to a carbon:nitrogen ratio test, and if the ratio is determined to be an unsatisfactory percentage, adding additional chemicals to said blended materials to obtain a predetermined proper ratio, checking and recording the temperature of said blended materials, checking and recording the moisture of said blended materials and adjusting the moisture if required, after said blended materials have been determined to have the predetermined carbon:nitrogen ratio, temperature, moisture, and chemical or bacterial content, manipulating said blended moisture again and allowing them to cure, p1 after curing, sifting and grading said cured compost material, returning the coarser composted material unsuitable for use as compost to said compost pad for re-composting, and weighing, bagging, and sealing said sifted compost material for resale to appropriate markets suitable or use as compost or fertilizer.

6. A process according to claim 5 including separating certain of the refuse remaining on said tipping floor facility into fuel items and packaging them for resale to appropriate markets or using them to heat said facility, separating certain other refuse remaining on said tipping floor facility into compostable items, blending and grinding said compostable items into fine particles for resale to appropriate markets or sending them to a compost pad for conversion into compost, mixing said fine particles of compostable material with other materials suitable for composting and initiating the decaying process of said organic substances contained therein, and packaging said cured compost material for resale to appropriate markets as fertilizer.

7. A process according to claim 5 in which the step of receiving refuse and dumping refuse on said tipping floor comprises allowing a refuse truck filled with incoming refuse to enter said recovery site, weighing said filled refuse truck and directing it to a suitable dumping area of said tipping floor facility, dumping the contents of said truck on said tipping floor, and weighing said empty truck upon its exit from said site.

8. A process according to claim 5 in which some of said wood chips are bagged for resale to appropriate markets or for use in heating said facility and sending certain other ones of said wood chips along with other compostables for conversion into compost.

9. A process according to claim 5 in which the step of further separating said non-compostable items into recyclable inorganic items and into non-compostable organic items comprises;

removing said non-compostable items including textiles, miscellaneous inorganic items, and non-compostable organic items from said tipping floor;

further separating said miscellaneous inorganic items into recyclable inorganic items including asphalt and concrete items, loading said recyclable inorganic items into containers for resale to the appropriate markets, further separating said non-compostable organic items into hospital and clinical wastes and into petroleum products for further processing, and sending said remaining non-compostable items including textiles, miscellaneous inorganic items, and organic items to a landfill.

10. A process according to claim 9 in which the step of further separating said non-compostable organic items into hospital and clinical wastes and into petroleum products for further processing comprises;

sending said hospital and clinical wastes including laboratory wastes and infectious wastes to an incinerator and after incineration transporting them to a hazardous waste disposal facility, sending said petroleum products including hazardous wastes and unclassified wastes to a holding area, and from said holding area, sending certain ones of said petroleum products to an incinerator, sending certain other ones of said petroleum products to a hazardous waste disposal facility, placing certain other petroleum products into containers and transporting them to a landfill, and sending certain other ones of the petroleum products back to sorting conveyor for re-processing.

11. A process according to claim 5 including after further separating said non-compostable items into recyclable inorganic items and into non-compostable organic items, loading said recyclable items, compostable items, and plastic bags containing substantially a combination thereof remaining on said tipping floor onto a sorting conveyor, removing large recoverable cardboard and paper items from said sorting conveyor and sending them to a baler and baling said recoverable cardboard and paper items for resale to the appropriate markets, removing said recoverable ferrous metal items from said sorting conveyor and placing them in containers for resale to the appropriate markets, removing said recoverable aluminum items from said sorting conveyor and sending them to a cleaner and after cleaning, baling said cleaned aluminum for resale to the appropriate markets, removing said recyclable glass items from said sorting conveyor and sending them to a glass breaker and after breaking, placing said broken glass items in containers for resale to the appropriate markets, removing recoverable plastic items from said sorting conveyor and sending them to a baler and baling said recoverable plastic items for resale to the appropriate markets.

12. A process according to claim 11 including after the step of removing said recoverable aluminum items from said sorting conveyor and prior to sending them to a cleaner adding additional aluminum items and thereafter, sending said recoverable and additional aluminum items to a cleaner and after cleaning, baling said cleaned aluminum for resale to the appropriate markets.

13. A process according to claim 11 including sending said plastic garbage bags remaining on said sorting conveyor containing substantially a combination of recyclable items and compostable items remaining on said sorting conveyor to a bag ripper and ripping open individual plastic garbage bags and scattering the contents thereof onto a picking conveyor, separating and removing recoverable cardboard and paper items from the refuse on said picking conveyor and sending said recoverable items to a baler and baling said recoverable cardboard and paper items for resale to the appropriate markets, separating and removing recoverable ferrous metal items from the refuse on said picking conveyor and placing them in containers for resale to the appropriate markets, separating and removing recoverable aluminum items from the refuse on said picking conveyor and sending them to a cleaner and after cleaning, baling said cleaned aluminum for resale to the appropriate markets, separating and removing recyclable glass items from the refuse on said picking conveyor and sending them to a glass breaker and after breaking, placing said broken glass items in containers for resale to the appropriate markets, separating and removing recoverable plastic items from the refuse on said picking conveyor and sending them to a baler and baling said recoverable plastic items for resale to the appropriate markets, sending said non-recoverable cardboard and paper items, said non-recoverable glass items, and other compostable wastes including yard and food wastes remaining on said picking conveyor to a blender and grinding it into fine particles for processing into compost or refuse derived fuel material.

14. A process according to claim 13 in which the step of processing said fine particles of nonrecoverable cardboard and paper items, non-recoverable glass items, and other compostable wastes including yard and food wastes and compostable items not used for refuse derived fuel into compost comprises;

placing said fine particle material into transport containers and sending them to a compost pad configured such that water or residue from composting material will run off into a holding pond and having a protective covering to prevent seeping or leaching of liquid residue into the earth or water supply, dumping said fine particle material from said transport containers onto said compost pad in windrows, pumping water onto said compost windrows, manipulating and blending said windrows of fine particle material until consistent in texture, subjecting samples of said blended materials to a carbon nitrogen ratio test, and if the ratio is determined to be an unsatisfactory percentage, adding additional chemicals to said blended materials to obtain a predetermined proper ratio checking and recording the temperature of said blended materials, checking and recording the moisture of said blended materials and adjusting the moisture if required, after said blended materials have been determined to have the predetermined carbon nitrogen ratio, temperature, moisture, and chemical or bacterial content, manipulating said blended materials again and allowing them to cure, after curing, sifting and grading said cured compost material, returning said coarser composted material unsuitable for use as compost to said compost pad for re-composting, and weighing, bagging, and sealing said sifted compost material suitable for use as compost or fertilizer for resale to the appropriate markets.

15. A process according to claim 14 wherein the predetermined carbon nitrogen ratio of said blended materials is 40 parts carbon to 1 part nitrogen.

16. A process according to claim 14 wherein the preferred temperature of said blended materials approximates the outdoor temperature on the day the reading is taken.

17. A process according to claim 14 wherein the moisture content of said blended materials is from 50% to 60%.

* * * * *